United States Patent

[19]

Cimini et al.

[11] Patent Number: 5,609,845
[45] Date of Patent: Mar. 11, 1997

[54] CATALYTIC PRODUCTION OF HYDROGEN FROM HYDROGEN SULFIDE AND CARBON MONOXIDE

[75] Inventors: Ronald J. Cimini, Sewell; David O. Marler, Deptford, both of N.J.; Stephen J. McCarthy, Glen Mills, Pa.; Harry A. McVeigh, Moorestown, N.J.; Gerald J. Teitman, Vienna, Va.

[73] Assignee: Mobil Oil Corporation, Fairfax, Va.

[21] Appl. No.: 385,529

[22] Filed: Feb. 8, 1995

[51] Int. Cl.$^6$ ................... C01B 3/02; C01G 1/04
[52] U.S. Cl. .............. 423/648.1; 423/416; 423/539; 423/571; 423/437 R
[58] Field of Search ............ 423/648.1, 512.1, 423/437, 416, 571, 539

[56] References Cited

U.S. PATENT DOCUMENTS

| | | | |
|---|---|---|---|
| 3,416,893 | 12/1968 | Parish et al. | 423/512.1 |
| 3,856,925 | 12/1974 | Kodera et al. | 423/416 |
| 3,903,243 | 9/1975 | Atsukawa et al. | 423/242 |
| 3,961,035 | 6/1976 | Mickley | 423/563 |
| 4,022,870 | 5/1977 | Palilla et al. | 423/244 |
| 4,277,458 | 7/1981 | Sugier et al. | 423/437 R |
| 4,432,960 | 2/1984 | Herrington et al. | 423/539 |
| 4,447,409 | 5/1984 | McGuiggan et al. | 423/416 |
| 4,489,048 | 12/1984 | Kuch | 423/416 |
| 4,496,530 | 1/1985 | McGuiggan et al. | 423/416 |
| 4,496,531 | 1/1985 | Kuch | 423/416 |
| 4,500,505 | 2/1985 | Jevnikar et al. | 423/416 |
| 4,517,171 | 5/1985 | Ratcliffe et al. | 423/648 R |
| 4,618,723 | 10/1986 | Herrington et al. | 423/416 |
| 4,999,178 | 3/1991 | Bowman | 423/571 |

*Primary Examiner*—Wayne Langel
*Attorney, Agent, or Firm*—Malcolm D. Keen; Gerald L. Harris

[57] ABSTRACT

There is provided a process for the catalytic production of hydrogen from the reaction of hydrogen sulfide and carbon monoxide with the elimination of the carbonyl sulfide and/or sulfur dioxide by-products. The carbonyl sulfide and the sulfur dioxide are combusted or reacted in one or more reaction steps with each other, oxygen and/or hydrogen sulfide to produce carbon dioxide, water, sulfur or sulfuric acid or a combination of these.

22 Claims, 1 Drawing Sheet

CATALYTIC PRODUCTION OF HYDROGEN FROM HYDROGEN SULFIDE AND CARBON MONOXIDE

FIELD OF THE INVENTION

This invention is directed to a process for the reaction of hydrogen sulfide with carbon monoxide to produce hydrogen along with the elimination of some reaction byproducts, such as carbonyl sulfide and sulfur dioxide.

BACKGROUND OF THE INVENTION

Hydrogen is used extensively in petroleum refining to upgrade the quality of various hydrocarbon products. One example is the desulfurization of gasoline and diesel fuels to remove sulfur which would, otherwise, be emitted as $SO_x$ in the combustion engine exhaust. Currently, the main source of hydrogen in a typical refinery is the process for the catalytic reforming of naphtha. However, with the arrival of the clean fuel regulations, which will require a significant reduction in gasoline aromatic levels, reformer severity will need to be reduced, and as a result, hydrogen production will be reduced. Compounding the problem is a related clean fuel requirement that the olefin and sulfur levels of gasoline be reduced, which will tend to increase the demand for hydrogen. The anticipated hydrogen deficiency can be off-set through outside purchases or construction of on-site hydrogen production plants. Both are costly options, with the outside purchase option also having the added disadvantage of a built-in dependence on outside suppliers.

In anticipation of the hydrogen deficiency problem, alternative approaches for producing hydrogen directly from refinery hydrocarbon streams, particularly waste streams, are being sought. One promising pathway is the production of hydrogen from hydrogen sulfide, an abundant byproduct of a number of refinery operations, e.g., catalytic and thermal cracking and hydrodesulfurization. Commonly, following recovery and purification of the $H_2S$ stream by amine scrubbing, the $H_2S$ is fed to a Claus plant where it is converted to water and elemental sulfur in a two step process. The first step in the process involves the combustion of part of the $H_2S$ to form water and $SO_2$. The $SO_2$ reacts further with the balance of the $H_2S$ in the second step to produce elemental sulfur and more water. The energy value of the hydrogen is lost in the process due to the formation of water. Other examples of processing options for $H_2S$ include chelation, and liquid-redox systems (e.g. Stretford).

If for simplicity, it is assumed that all of the sulfur generated in a refinery is $H_2S$ based, hydrogen production potential from $H_2S$ for a typical high conversion 200,000 BPD refinery is estimated below in Table 1.

TABLE 1

| Crude Gravity, API | Crude Sulfur, wt. % | $H_2$ Potential, MMSCFD |
|---|---|---|
| 22.5 | 3.5 | 20 |
| 30.0 | 2.0 | 10 |
| 35.0 | 0.5 | 2 |

A considerable body of literature exists on the production of hydrogen from hydrogen sulfide. The methods of production include direct dissociation via thermal, electrolytic, and photochemical methods, high energy dissociation (e.g. microwave), as well as numerous catalytic methods, including those involving reaction with CO and $CO_2$.

Direct Decomposition

Dissociation of $H_2S$ into its constituent parts, hydrogen and sulfur, is not thermodynamically favorable at low temperatures. Conversion levels have been reported of less than 5% at temperatures of less than 1,300° F. and less than 40% at temperatures as high as 2,400° F. U.S. Pat. No. 4,302,434 discloses that higher conversion levels are possible by cooling and separating the product sulfur and hydrogen to enable recycling of the unreacted feed. Highly concentrated sunlight can be used as the heat source in a high temperature (2,400° F. to 2,800° F.) operation. While a number of options are available for providing the energy required to drive the low single pass conversion reaction, the costs associated with recycling the large amount of gases as well as those associated with cooling and reheating of the product gases can be prohibitive.

Electrolytic Decomposition

Methods have been reported that decompose $H_2S$ by electrolytic means. High selectivity for hydrogen production was achieved using a solution of $H_2S$ in pyridine, but problems were reported with corrosion of the electrodes and excessive energy requirements. Indirect electrochemical conversion of hydrogen sulfide using hydriodic acid was also reported. Also reported were a number of obstacles to the commercialization of this method, including the highly corrosive nature of the electrolytic solution, loss of iodine vapor due to low vapor pressure, and high energy requirements. U.S. Pat. Nos. 3,249,522 and 3,409,520 disclose direct electrolytic oxidization of sulfide ions from hydrogen sulfide to produce hydrogen and sulfur, along with other products.

Photochemical Decomposition

It has also been reported that light can be used to induce the production of hydrogen from hydrogen sulfide, indirectly, through an intermediate water splitting reaction. In this process, quanta of energy, supplied by a visible light source, induce the release of electrons from cadmium sulfide molecules which act as catalysts in this reaction. The cadmium sulfide is present in the form of a colloidal suspension in an aqueous solution. These electrons then react, in a water splitting reaction, to form molecular hydrogen and two free hydroxyl ions. The hydroxyl ions then go on to react with hydrogen sulfide, thus producing water and a negatively charged sulfur species. The sulfur molecule readily loses these electrons, in the presence of ruthenium dioxide, also dissolved in the solution, to form free sulfur and the original cadmium sulfide. Very low conversions of about 0.4 mole % per hour have been reported. These rates of production of hydrogen are too low to be practical for commercial application.

High Energy Dissociation

The use of microwaves in the production of hydrogen from hydrogen sulfide has been recently reported by a number of authors. In a typical process, the microwave energy, when applied to hydrogen sulfide gas, induces a cold non-equilibrium plasma which readily dissociates into hydrogen and sulfur. The dissociation reaction takes place at relatively low pressure (e.g. less than 1 atmosphere) and low microwave energy levels (400 to 1,000 W). Reported per pass conversion is between 70 and 90% using a cyclone type reactor design. The cyclone design, which is generically applicable to a non-microwave driven dissociation process, permits rapid condensation and de-entrainment of the dissociated sulfur from the resulting plasma.

Catalytic Dissociation

U.S. Pat. No. 4,066,739 discloses the use of aqueous iodine and hydriodic acid to promote the dissociation of hydrogen sulfide into hydrogen and sulfur.

Catalysts that have been identified for $H_2S$ dissociation are "low" oxidation state metal sulfides. Typically, $H_2S$ reacts with the "low" oxidation state metal sulfide to produce a "higher" metal sulfide, which then thermally decomposes back to the "low" metal sulfide liberating elemental sulfur in the process. In some cases the resulting "low" metal sulfide may be different from the starting material, yet maintain its catalytic activity. Many of these catalysts show an approach to equilibrium that is much more rapid at low temperatures and, in all cases, far exceeds the thermal cracking "per pass" conversion. Reported examples of these catalysts include molybdenum disulfide ($MoS_2$) and tungsten disulfide ($WS_2$) at temperatures between 500° C. and 860° C. Also reported was that $MoS_2$ supported on alumina (8 wt. % on alumina) and calcined at high temperatures (1,140° C.) was more catalytically active than the unsupported material. Vanadium pentoxide was reported to be effective at a temperature range of 450° C. to 600° C., and was even found to produce a higher $H_2S$ conversion than the sulfided form, $V_2S_3$. Iron sulfide, FeS, was reported to be converted to $Fe_2S_3$ at 600° C. with about 30% conversion of $H_2S$ to $H_2$.

Based on the thermodynamically limited once-through conversion of hydrogen sulfide, some work has been reported on efforts to design reactors with built in "hot" product removal systems. Use of these systems allows the equilibrium to be pushed further toward hydrogen production as a result of the product drain, and recycle requirements can be significantly reduced. One specially designed reactor is a "selective membrane" type reactor, where the catalyst is placed in an annulus between two concentric cylinders. The outer wall of the annulus is composed of a nonporous material (e.g. aluminum tubing), while the inner wall is made from a high temperature, microporous membrane capable of separating hydrogen from hydrogen sulfide under small (less than 5 atmospheres) pressure gradients. Typical membrane materials identified were Vycor glass tubing and alumina treated to provide the necessary pore size distribution. The ability of these thin membranes to maintain their integrity in a high stress environment is a major obstacle to scale-up and commercialization. An alternative reactor design, the thermal diffusion reactor, has also been reported. This design utilizes the temperature difference between a cold outer reactor wall and a hot inner wall, which is coated with the desired catalyst. The imposed thermal gradient causes the hydrogen to rise while the heavier hydrogen sulfide accumulates at the lower end of the reactor, where, in the absence of hydrogen, it can continue to react. Unfortunately, this device requires relatively long residence times and has very high thermal losses resulting from the large temperature differences between the two surfaces.

Other Catalytic Mechanisms

U.S. Pat. No. 3,856,925, incorporated by reference herein, discloses the use of metal sulfides which contain 1, 2, 3, 4, 6, 7, 8, and 9 d electrons in their metal ion constituents to react $H_2S$ and CO to produce $H_2$ and COS. Metals of Group V, Group VI, and Group VIII were identified as having this characteristic, and particularly identified were sulfides of vanadium, molybdenum, tungsten, chromium, cobalt, nickel, platinum, palladium and rhodium.

U.S. Pat. No. 4,500,505, incorporated by reference herein, discloses the use of various multi-metal oxides and sulfides of the form $M_aO_xS_yM'_bM''_c$ to react $H_2S$ and CO where M is at least one of Mo, W, Fe, Cr, and V, M' is at least one of Li, Na, K, Rb, Cs, Cu, Co, and Al when b is greater than 0, M" is at least one of Sn, Mn, Pb, Ge, Si, Mg, Ca, Sr, Ba, Zn, Ti, Hf, and Zr when c is greater than 0, a is a number of about 0.1–2, b is a number of 0 to about 3, c is a number of 0 to about 10, with the requirements that at least one of b and c is greater than zero, and that the sum of x+y be a number that satisfies the valence requirements of the other elements present.

U.S. Pat. No. 4,496,531, incorporated by reference herein, discloses the use of a precious metal promoter on a multi-metal catalyst that is similar to the one described above to react $H_2S$ and CO. The formula for this catalyst is $M_{0.1-2}M'_{0.01-1}M''_{0.01-1}O_xS_y$ where M is at least one of Mo, W, and Fe, is at least M' is at least one of Ru, Rh, Ag, Pt, Pd, Au, Re, Os, and Ir, M" is at least one of V, Cr, Ti, Co, Ni, and Cu, and the sum of x+y is a number that satisfies the valence requirements of the other elements present.

U.S. Pat. No. 4,489,048, incorporated by reference herein, discloses the use of heteropolyanionic metal complexes, such as heteropoly tungstates and molybdates to drive the reaction of hydrogen sulfide with carbon monoxide. The formula for these complexes is $A_{1-10}(M_{6-18}M'_{1-3}V_{0-2}O_xS_y)\cdot nH_2O$ where A is at least one cation of $NH_4$, Na, K, Li, H, Cs, Rb, Ca, Ba, and Mg, M is at least one of Mo and W, M' is at least one of P, As, Bi, Ce, Cu, Ge, Sn, Ti, Si, Ni, Fe, Co, Al, Cr, Th, Zn, and Te, n is a number of 0 to about 42, and the sum of x+y is a number that satisfies the valence requirements of the other elements present.

An alternative to the metal sulfide approach is disclosed in U.S. Pat. No. 4,496,530, incorporated by reference herein, where metal intercalates of graphite were used as catalysts for the reduction of hydrogen sulfide with carbon monoxide. The formula for these intercalates is $M_aC_{100-a}$ where M is at least one of Co, Fe, Ni, Pd, Cu, Mo, W, V, Nb, Ta, Ru, Os, Rh, Ir, and Ti, C is graphite, and a represents the weight percent of M present in the intercalate and has a value between 0.1 and 30. Another alternative to metal sulfides is disclosed in U.S. Pat. No. 4,447,409, incorporated by reference herein, where a metal boride, carbide, nitride, and/or silicide catalyst is used. A formula for this catalyst is $M_{1-3}M'_{1-2}$ where M is at least one of Ti, Zr, Hf, V, Nb, Ta, Cr, Mo, W, Mn, Fe, and Co, and where M' is at least one of B, N, C, and Si.

U.S. Pat. No. 4,517,171 disclosed that the rutile form of titania was effective for driving the $H_2S$/CO reaction, however, this material produced large quantities of methane ($H_2$:$CH_4$ was approximately equal to 1) as well as considerable quantities of ethanethiol and methyl mercaptan. U.S. Pat. No. 4,544,649 disclosed the use of tantalum oxide supported on titania for the $H_2S$/CO reaction, and also disclosed that this catalyst produced large quantities of methane with a resulting low hydrogen selectivity.

For environments where carbon monoxide is not available, carbon dioxide can be used. U.S. Pat. No. 4,432,960 discloses a thermochemical cycle using Lewis or Brönsted acid catalysts such as oxides and/or sulfides of the Group VIB and VIIB metals to catalyze the $H_2S$/$CO_2$ reaction to produce $H_2$ and $SO_2$, the latter of which is an environmentally undesirable product. A number of thermochemical cycles involving the initial reaction of $H_2S$ with $CO_2$ or CO were disclosed in U.S. Pat. No. 4,999,178.

SUMMARY OF THE INVENTION

This invention is directed to the production of hydrogen from hydrogen sulfide and to the elimination of the byproduct, carbonyl sulfide. One embodiment of this invention includes a process for producing hydrogen from hydrogen sulfide and carbon monoxide comprising directing a gas stream comprising hydrogen sulfide and carbon monoxide over a first catalyst at conditions effective to react the hydrogen sulfide with the carbon monoxide and to thereby produce hydrogen and carbonyl sulfide. Then, at least a portion of the hydrogen produced above is recovered as a product. Next, at least a portion of the carbonyl sulfide produced above is reacted with oxygen, optionally over a second catalyst, under conditions effective to produce carbon dioxide and at least one of sulfur dioxide or elemental sulfur. Then, optionally, at least a portion of any sulfur dioxide produced by the reaction above is reacted over a third catalyst with at least one of hydrogen sulfide, carbonyl sulfide, oxygen or calcium carbonate to produce at least one of water, elemental sulfur, carbon dioxide, sulfur trioxide, calcium sulfite and mixtures thereof, and, optionally, hydrolyzing at least a portion of any sulfur trioxide produced with water to make sulfuric acid or oxidizing and hydrating at least a portion of any calcium sulfite produced above to make calcium sulfate (gypsum).

DETAILED DESCRIPTION OF THE INVENTION

The most common pathway for hydrogen production from $H_2S$ is the water gas shift analog.

$$H_2S + CO \rightarrow H_2 + COS$$

As indicated, the primary products from this reaction are hydrogen and carbonyl sulfide (COS), however, depending on the catalytic material used, secondary reactions to methane, carbon dioxide and a variety of other hydrocarbons, including mercaptans, are also possible. Examples of some of these side reactions are given below.

$$3 H_2 + CO \rightarrow CH_4 + H_2O$$

$$H_2O + CO \rightarrow H_2 + CO_2$$

For this reason, a measure of hydrogen sulfide conversion alone is not a sufficient gauge of the success of a catalyst in driving this reaction. Additional information indicative of the selectivity for hydrogen production, frequently reported as hydrogen to methane and hydrogen to carbon dioxide ratio, is also important.

This invention is directed to the catalytic reaction of hydrogen sulfide with carbon monoxide to produce hydrogen and carbonyl sulfide, among other compounds. While hydrogen is a desirable gas which is useful in many other catalytic reactions, there is little demand for carbonyl sulfide. Therefore, this invention further comprises the elimination of the carbonyl sulfide that is produced above. A number of reaction options to eliminate this carbonyl sulfide are envisioned as a part of this invention. These reaction options include the reaction or combustion of the carbonyl sulfide with a sufficient amount of oxygen (typically less than 1 mole oxygen per mole carbonyl sulfide, e.g., less than about 0.5 mole $O_2$/mole COS) to produce carbon dioxide and elemental sulfur. When the oxygen level is greater than about 0.5 mole $O_2$/mole COS, production of $SO_2$ may result. Another option is the reaction with a sufficient amount of oxygen (typically more than 1 mole oxygen per mole carbonyl sulfide, e.g., at least about 1.5 mole $O_2$/mole COS) to produce carbon dioxide and sulfur dioxide.

Recognizing that sulfur dioxide is also generally undesirable as a product, this invention further comprises treating the sulfur dioxide in one or more ways to produce more desirable products. These include reacting the sulfur dioxide with hydrogen sulfide to produce water and elemental sulfur using the second of the well-known Claus reactions, reacting the sulfur dioxide with carbonyl sulfide to produce carbon dioxide and sulfur, reacting the sulfur dioxide with calcium carbonate to produce calcium sulfite and then oxidizing and hydrating the calcium sulfite to produce calcium sulfate (gypsum) and finally oxidizing the sulfur dioxide to sulfur trioxide and then hydrolyzing the sulfur trioxide with water to produce sulfuric acid, as is typically done in sulfuric acid production plants. Representations for some of these reactions are presented below. To aid understanding, these representations have been placed into four groups, however, it should be understood that these representations and these groups are not intended to limit the invention.

| $H_2S$ and CO to Produce $H_2$, $CO_2$, Water and Sulfur | | |
|---|---|---|
| | $H_2S$ + | $CO \rightarrow H_2$ + COS |
| | COS + | $3/2\ O_2 \rightarrow CO_2 + SO_2$ |
| 2 | $H_2S$ + | $SO_2 \rightarrow 2\ H_2O + 3/x\ S_x$ |
| 3 | $H_2S$ + | $CO + 3/2\ O_2 \rightarrow H_2 + CO_2 + 2\ H_2O + 3/x\ S_x$ |
| $H_2S$ and CO to Produce $H_2$, $CO_2$, and Sulfur | | |
| 3 | $H_2S$ + | $3\ CO \rightarrow 3\ H_2 + 3\ COS$ |
| | COS + | $3/2\ O_2 \rightarrow CO_2 + SO_2$ |
| 2 | COS + | $SO_2 \rightarrow 2\ CO_2 + 3/x\ S_x$ |
| 3 | $H_2S$ + | $3\ CO + 3/2\ O_2 \rightarrow 3\ H_2 + 3\ CO_2 + 3/x\ S_x$ |
| $H_2S$ and CO to Produce $H_2$, $CO_2$, and Sulfur | | |
| | $H_2S$ + | $CO \rightarrow H_2$ + COS |
| | COS + | $1/2\ O_2 \rightarrow CO_2 + S$ |
| | $H_2S$ + | $CO + 1/2\ O_2 \rightarrow H_2 + CO_2 + S$ |
| $H_2S$ and CO to Produce $H_2$, $CO_2$, and Sulfuric Acid | | |
| | $H_2S$ + | $CO \rightarrow H_2$ + COS |
| | COS + | $3/2\ O_2 \rightarrow CO_2 + SO_2$ |
| | $SO_2$ + | $1/2\ O_2 \rightarrow SO_3$ |

| | | |
|---|---|---|
| $SO_3$ | + | $H_2O \rightarrow H_2SO_4$ |
| $H_2S$ | + | $CO + 2\,O_2 + H_2O \rightarrow H_2 + CO_2 + H_2SO_4$ |

Each of these reactions will be more fully described below, including typical catalysts and reaction conditions.

H$_2$S and CO Water Gas Analog Reaction

As has been described above, a number of materials are useful to catalyze the water gas analog reaction of H$_2$S with CO to produce hydrogen and carbonyl sulfide.

$$H_2S + CO \rightarrow H_2 + COS$$

The most desirable catalysts for use in this invention are those that are effective at catalyzing this reaction without excessive (preferably zero) production of side products (e.g., methane, water, carbon dioxide, carbon disulfide, and sulfur dioxide, among others). Side product formation is undesirable since it implies a loss in hydrogen yield. Materials useful as catalysts for this reaction generally include mixed metal sulfides, e.g., sulfides of transition metals, especially silica supported metal sulfides. Particular examples of useful catalysts include silica supported sulfided iron tungstate, nickel cobalt molybdate, cobalt molybdate, nickel tungstate and a magnesium aluminate that further comprises cerium and vanadium $CoMoO_4$ on silica, $FeWO_4$ on silica, $NiWO_4$ on silica, $Ni_{0.5}Co_{0.5}MoO_4$ on silica, and a magnesium aluminate further comprising cerium and vanadium. Also useful, but slightly less effective and active, is $Bi_4Fe_4Mo_{12}O_{48}$. Materials which also catalyze the hydrogen sulfide conversion reaction include the above metal oxides supported on alumina, a commercial Claus catalyst (titania quadralobe), $LaCoO_3$ on silica-clay, at least one metal oxide supported on alumina or silica, and commercially available hydrotreating catalysts (e.g., a cobalt-molybdenum catalyst supported on alumina).

Equilibrium hydrogen sulfide conversion generally increases with decreasing reaction temperature. In addition to the advantage of increasing conversion, lower reaction temperatures have an added benefit of reduced process requirements for fuel, steam and other utilities. Typical reaction temperatures are about 250° F. to about 1,350° F., e.g., about 300° F. to about 1,000° F., e.g., about 350° F. to about 800° F., e.g., about 400° F. to about 750° F., with about 500° F. also useful. Typical reaction pressures are about 0 to about 400 psig, e.g., about 0 to about 50 psig. Typical gas hourly space velocities are about 50 to about 5,000 hr$^{-1}$, e.g., about 100 to about 2,500 hr$^{-1}$, e.g., about 500 to about 1,200 hr$^{-1}$.

Hydrogen sulfide conversion also increases with an increasing CO to H$_2$S ratio. Generally the CO to H$_2$S feed ratio should be greater than about 1, e.g., greater than about 1.2, e.g., greater than about 2, e.g., at least about 4 or more.

Disposition of Carbonyl Sulfide

One of the major obstacles to the production of hydrogen through the use of the water gas analog reaction described above is the production of a large amount of carbonyl sulfide. For the catalysts that are most desirable for use in the water gas analog reaction, where the production of carbon dioxide is low, each mole of hydrogen produced also yields one mole of carbonyl sulfide. In terms of environmental concerns, carbonyl sulfide is similar to hydrogen sulfide. Hence, disposition of carbonyl sulfide is a significant concern. Unfortunately, there is no significant commercial market for this material, leaving conversion to alternative materials as the preferable disposition. One possibility is the dissociation to carbon monoxide and sulfur. It has been reported that carbonyl sulfide decomposition can be accomplished at about 1,000° F. over various aluminas and silica, however at this temperature, the major reaction products are carbon disulfide and carbon dioxide. While there is a limited market for carbon disulfide, the market would not sustain the large influx of carbon disulfide that would result from conversion of a significant number of refinery hydrogen sulfide streams. In addition, new product handling facilities would be required in petroleum refineries, which tends to make this option unlikely. At very high temperatures, selectivity shifts toward more desirable products, carbon monoxide and sulfur. The cost of fuel, steam, and other utilities associated with this high temperature operation combined with relatively low conversion (less than about 70%), and, hence, the need for recycle, do not make direct decomposition an attractive option.

An alternative process option included as a part of this invention is the complete combustion of carbonyl sulfide in air or oxygen to form carbon dioxide and sulfur dioxide followed by catalytic oxidation of the sulfur dioxide to sulfur trioxide and hydrolysis of the resulting sulfur trioxide to produce sulfuric acid. Another process option included as a part of this invention is the complete combustion of carbonyl sulfide in air or oxygen to form carbon dioxide and sulfur dioxide followed by the reaction of the sulfur dioxide with hydrogen sulfide to produce water and sulfur (i.e. the Claus reaction). Yet another process option is the combustion of one-third of the carbonyl sulfide in air or oxygen to form carbon dioxide and sulfur dioxide followed by the reaction of the sulfur dioxide with the balance of the carbonyl sulfide to produce carbon dioxide and sulfur. Another process option is the reaction or combustion of carbonyl sulfide directly to carbon dioxide and sulfur in an oxygen lean environment (e.g., less than about 0.5 moles oxygen per mole carbon disulfide).

Combustion of Carbonyl Sulfide

Combustion of carbonyl sulfide in sufficient air or oxygen to provide at least about 1 mole oxygen per mole carbonyl sulfide, e.g., greater than about 1.5 mols oxygen per mole carbonyl sulfide, e.g., at least about 1.6 moles O$_2$/mole COS, is effective to produce carbon dioxide and sulfur dioxide at high conversion levels (generally at or near 100%, e.g., greater than 95% carbonyl sulfide conversion). Typical temperatures for this conversion are those greater than about 400° F., e.g., between about 400° F. and about 1,500° F., e.g., between about 500° F. and about 1,400° F., e.g., between about 600° F. and about 1,300° F. This combustion may be conducted at a pressure of subatmosperic up to about several atmospheres, e.g., about 0 psig to about 50 psig. No catalyst is required for this combustion, however, suitable catalysts may also be used, if desired.

Substoichiometric Reaction of Carbonyl Sulfide

The reaction or combustion of carbonyl sulfide directly to carbon dioxide and sulfur in an oxygen lean environment (e.g., generally less than about 1 mole oxygen per mole carbonyl sulfide, e.g., less than about 0.7 moles O$_2$/mole COS, e.g., less than about 0.6 moles O$_2$/mole COS, e.g., less than about 0.5 moles oxygen per mole carbonyl sulfide) may be achieved over gibbsite, activated alumina and mixtures of these, such as $\chi$-alumina/gibbsite, among others. Activated alumina as used herein includes $\gamma$-alumina, $\eta$-alumina, $\chi$-alumina, $\rho$-alumina, and mixtures of these. Activated alumina is available commercially as Alcoa S-201 and S-501, among others. Typical temperature ranges for this conversion are about 250° F. to about 1,000° F., e.g., about 400° F. to about 900° F., e.g., about 500° F. to about 750° F.

Typical pressures for this conversion are about 0 psig to about 400 psig, e.g., about 0 psig to about 50 psig. Typical gas hourly space velocities (GHSV) are about 50 to about 5,000 hr$^{-1}$, e.g., about 100 to about 2,500 hr$^{-1}$, e.g., about 700 to about 1,300 hr$^{-1}$.

Sulfur Dioxide Reactions

Sulfuric Acid Production

The sulfur dioxide resulting from the complete combustion of carbonyl sulfide may be catalytically oxidized to sulfur trioxide and then the sulfur trioxide hydrolyzed to produce sulfuric acid. Sulfuric acid is the worlds largest commodity chemical and is used in many refineries as an alkylation catalyst and as a water treating chemical. A general description of a typical sulfuric acid production process is given in the *Kirk-Othmer Encyclopedia of Chemical Technology*, 3d ed., Vol. 22, 190–232, John Wiley, New York, 1983, incorporated by reference herein. Typical catalysts used for the oxidation of sulfur dioxide to sulfur trioxide are vanadium and potassium salts supported on silica, usually diatomaceous earth. The reaction is typically conducted at a temperature of about 400° C. to about 500° C., e.g., about 410° C. to about 430° C. and at atmospheric pressure up to about 30 psig, e.g., about 2 psig to about 10 psig. The reaction is typically conducted using a staged reactor with intercooling, wherein the typical sulfur dioxide conversion is about 97 to about 98 percent. The resulting sulfur trioxide is then adsorbed in circulating sulfuric acid, which was typically generated from the process. Water is continuously added to maintain the desired acid concentration, typically about 98.5 wt. %.

Sulfur Dioxide Reacted with Hydrogen Sulfide

Alternatively, the sulfur dioxide resulting from the combustion of the carbonyl sulfide may be reacted with hydrogen sulfide according to the well known Claus reaction.

$$2\ H_2S + SO_2 \leftrightarrow 2\ H_2O + 3/x\ S_x$$

This reaction proceeds readily at about 200° C. to about 320° C. over a variety of catalysts including alumina, titania and iron oxide. U.S. Pat. Nos. 4,818,740; 4,857,297; and 4,988,494, incorporated by reference herein, provide a description of the Claus process.

Sulfur Dioxide Reacted with Carbonyl Sulfide

Additional carbonyl sulfide and the sulfur dioxide resulting from the combustion of carbonyl sulfide may also be reacted to form carbon dioxide and sulfur according to the following reaction.

$$2\ COS + SO_2 \rightarrow 2\ CO_2 + 3/x\ S_x$$

This reaction may be conducted at temperatures of over about 200° C., e.g., about 200° C. to about 700° C., e.g., about 200° C. to about 600° C., e.g., about 200° C. to about 400° C. Typical pressures are about 0 psig to about 50 psig. The gas hourly space velocity (GHSV) for this reaction is typically about 50 to about 5,000 hr$^{-1}$, e.g., about 500 to about 2,500 hr$^{-1}$, e.g., about 700 to about 1,300 hr$^{-1}$. Catalysts that may be used in this reaction include α-alumina, activated alumina, Cr/γ-alumina, Ni/γ-alumina, La$_2$O$_2$S and mixtures thereof, such as χ-alumina/gibbsite. Activated alumina includes γ-alumina, η-alumina, χ-alumina, ρ-alumina, and mixtures of these. χ-alumina is a cubic form of alumina produced from the calcination of gibbsite at about 660° F. Also useful are commercially available activated alumina catalysts such as Alcoa S-201 and Alcoa S-501.

Additional information on this reaction may be found in Haas, L. A., and Khalafalla, S. E., "Catalytic Thermal Decomposition of Carbonyl Sulfide and its Reaction with Sulfur Dioxide," *Journal of Catalysis*, Vol. 30, 451–459, 1973; Goodboy, K. P., "Catalyst Increases COS Conversion," *Oil and Gas Journal*, 86–96, 2/18/1985; and Baglio, J. A., "Lanthanum Oxysulfide as a Catalyst for the Oxidation of CO and COS by SO$_2$," *Ind. Eng. Chem. Prod. Res. Dev.*, Vol. 21, 38–41, 1981, each incorporated by reference herein.

Sulfur Dioxide reacted with Calcium Carbonate to form Gypsum

The sulfur dioxide resulting from the combustion of the carbonyl sulfide may be bubbled through an aqueous solution of calcium carbonate (found in limestone) to form calcium sulfite. The calcium sulfite is then reacted under mild conditions in moist air over a catalyst containing a small amount of iron or manganese to form calcium sulfate (gypsum).

Each of the above described catalytic reactions may be carried out in one or more fixed beds, fluidized beds, or moving beds of catalyst. However, other contacting means are also contemplated, such as contacting with a fixed fluid bed, a transport bed, and a monolithic catalyst structure such as a honeycomb.

The catalysts useful in this invention may be supported on a variety of materials, such as silica, alumina, clay, zirconia, titania, silica-alumina and silica-magnesia, silica-zirconia, silica-thoria, silica-berylia, silica-titania, as well as ternary compounds such as silica-alumina-thoria, silica-alumina-zirconia, silica-alumina-magnesia, and silica-magnesia-zirconia. A mixture of these components could also be used. Some of these materials may be less desirable for use in the process of this invention, e.g., alumina is less desirable for hydrogen sulfide conversion to hydrogen at higher temperatures, due to a decreased hydrogen selectivity when compared with silica. The support may be in the form of a cogel. The relative proportions of catalytic component and support material on an anhydrous basis may vary widely with the active catalytic component content ranging from between about 5 to about 99 percent by weight and more usually in the range of about 10 to about 80 percent by weight of the dry composite.

Catalysts useful in this invention are typically used in the sulfided state. Typically, non-sulfided oxides will form sulfides and water when exposed to H$_2$S. This reaction will continue until the catalyst is sulfided, after which H$_2$ production commences. If it is desired to sulfide the catalysts, the sulfiding may be done in any way that is known in the art, such as sulfiding the catalyst prior to loading it into the reactor, sulfiding the catalyst after loading it into the reactor, but before processing the normal feed gases, or sulfiding the catalyst while processing the normal feed gases.

As will be recognized by those skilled in the art, suitable separation equipment, such as membranes, absorbents, adsorbents and the like, may be used to separate one or more of the feeds or products of the various reactions of this invention. For example, any or all of the feeds or reaction products described above, including hydrogen, hydrogen sulfide, carbonyl sulfide, sulfur dioxide, and carbon dioxide may be separated from the other components present in any feed or product stream of this invention. Any needed separation equipment is also included within the concept of this invention, as is any other equipment customarily used in gas, sulfur or sulfuric acid production, treatment and handling.

EXAMPLE 1

A sample of a commercially available magnesium aluminate spinel further comprising cerium and vanadium, Katalistiks DESOX™, was obtained.

EXAMPLE 2

A sample of a commercially available Claus catalyst, titania quadralobe, Alcoa S-701, was obtained.

EXAMPLE 3

A sample of a commercially available hydrotreating catalyst, CoMo/alumina, Ketjen KF-752, was obtained.

EXAMPLE 4

A sample of $LaCoO_3$ was prepared as follows. Solutions of lanthanum nitrate and cobalt nitrate were mixed. The mixed oxide was precipitated at a pH of 9 using ammonium hydroxide. The precipitate was recovered by filtration, washed, dried, and calcined in a muffle furnace at 800° C. for 4 hours in air. The calcined material was ball milled for 62.5 hours to a 3.5 micron mean particle size. The ball milled material was added to kaolin clay (Thiele RC-32, Thiele Kaolin Co., Sandersonville, Ga.) and was agitated for 5 minutes, then colloidal silica (Nalco 1034A, Nalco Chemical Co., Chicago, Ill.) was added. The mixture was agitated for 3 minutes and the pH was adjusted to 4. The mixture was then spray dried at a 360° F. outlet temperature. The spray dried material was calcined in a muffle furnace for 2 hours at 1,000° F. in air. The resulting catalyst contained 40 wt. % of the mixed-metal oxide and 60 wt. % support.

EXAMPLE 5

Samples of $CoMoO_4$/alumina, $FeWO_4$/alumina, $NiWO_4$/silica, $CoMoO_4$/silica, $FeWO_4$/silica, $Ni_{0.5}Co_{0.5}MoO_4$/silica, and $AgMnO_4$/silica were prepared by refluxing the appropriate metal nitrates with ammonium molybdate or ammonium tungstate and either colloidal silica (Ludox AS-40, E.I. Dupont de Nemours and Co., Wilmington, Del.) or pseudoboehmite alumina (Catalpal B™, Vista Chemical Co., Houston, Tex.). The recovered catalysts were then dried and pulverized before calcining in air at 600° C. for 4 hours. The resulting catalysts contained 80 wt % of the mixed metal oxides and 20 wt. % support.

EXAMPLE 6

A sample of $Ag_2O$/silica was prepared by refluxing silver nitrate and Ludox AS-40 silica. The recovered catalyst was then dried and pulverized before calcining in air at 600° C. for 4 hours. The resulting catalyst contained 10 wt. % of the silver oxide and 90 wt. % silica.

EXAMPLE 7

A sample of $Bi_4Fe_4Mo_{12}O_{48}$ was prepared as follows. Ammonium hydroxide (10%) was added to a solution of ammonium-heptamolybdate in water to achieve a pH value of 9. The resulting solution was then mixed with colloidal silica and added to a mixture of bismuth nitrate, iron nitrate and 10% nitric acid. After drying overnight, the solid was calcined in air at 290° C. for 4 hours and then at 425° C. for an additional 4 hours. The calcined material was then crushed and calcined again at 650° C. for 6 hours. The resulting catalyst contained 50 wt. % of the mixed metal oxide and 50 wt. % support.

EXAMPLE 8

Experiments were conducted in a downflow fixed bed reactor. Reactant flow rates were monitored and controlled using Brooks model #5850 mass flow controllers, while flush nitrogen flow rates were controlled using a Brooks rotameter. The reactor was a ⅜ inch inner diameter (ID) quartz tube approximately 12 inches in length. One internal K-type thermocouple, located approximately at the mid-point of the catalyst bed was used to monitor the reactor temperature. The reactor temperature was controlled with a single zone, 800 watt Lindberg furnace coupled with an Omega model CN310 controller. The feed gases were preheated over a 1.5 foot long inlet section prior to entering the reactor. The reactor exit line was also heat traced and maintained above the melting point of sulfur to prevent solid sulfur deposition in these lines.

The reactor effluent was passed through a warm trap to capture any sulfur produced as a liquid. The warm trap was composed of a standard liquid dropout vessel and was filled with 3 mm glass balls. The glass balls provided sufficient surface area for heat transfer and a tortuous flow path for liquid droplet de-entrainment. The warm trap was immersed in a bath of "high temperature" silicone oil which was maintained at 160° F. using a Therm-O-Watch™ temperature controller (Model L6 1000 SS). Effluent from the warm trap was directed to a cold trap immersed in ice and intended to capture any water or entrained heavy components that might be formed. Effluent from the cold trap passed through a series of gas bombs and into a bubble column prior to $H_2S$ removal (via zinc oxide) and venting of the product gases.

For each run, 3 grams of 14/24 mesh catalyst were used. To ensure that gases were at the reactor temperature before contacting the catalyst, 1 cc of acid washed quartz chips, as well as a small amount of quartz wool, was added at the top of the catalyst bed. Prior to introducing the reactants, the catalyst was first dried in nitrogen at 1,100° F. and then sulfided overnight with 15 cc/min hydrogen sulfide at reaction temperature. Sulfiding was considered complete when the inlet and outlet hydrogen sulfide flows were equal.

The typical run duration was four hours. Samples of the effluent gases were taken at both the mid-point and the end of each run. Gas analysis was performed using an Arnel extended refinery gas analyzer (modified Hewlett-Packard model 5890A). A sample of the gas was also analyzed by mass spectroscopy. The catalysts were tested at 750° F., 500° F., and 250° F., 1 atmosphere, 950 $hr^{-1}$ gas hourly space velocity (GHSV) and a nominal carbon monoxide to hydrogen sulfide ratio of 1.2. Results of this testing are shown in Tables 2, 3, and 4. In addition to $H_2S$ conversion data, hydrogen selectivity, given as the mole ratio of hydrogen to hydrogen plus side products, and an effective hydrogen yield number are also reported. The effective hydrogen yield number is calculated as the product of the hydrogen sulfide conversion and the hydrogen selectivity divided by 100. Selectivities to the undesirable products, methane and carbon dioxide, are listed as the mole ratio of hydrogen formed to methane and carbon dioxide formed, respectively. At 750° F., many of the tested catalysts exhibited unacceptably high hydrogen yield losses. Many of the catalysts which exhibited low selectivity also had very high conversions, in excess of equilibrium (approximately 25%). This is consistent with methane formation via CO hydrogenation. Formation of these byproducts results in a hydrogen sink which allows conversion to be driven higher in an effort to achieve an equilibrium hydrogen level. Also illustrated in Table 2 is the effect of the catalyst support at 750° F. The use of alumina as a support results in high selectivity to undesirable side products. This may be due either to the alumina alone or to some complex which may form between the alumina and the metal oxide/sulfide. Equilibrium hydrogen sulfide conversion increases with decreasing reaction temperature. In addition to the advantage of increasing conversion, lower reaction temperatures have an added benefit of reduced requirements for utilities, such as fuel, steam, power, and water. In general, reducing the reaction temperature to 500° F. results in an increase in hydrogen selectivity for all of the catalysts evaluated, with most producing no by-product methane at all. The most striking improvements in activity occurred with the alumina supported catalysts, indicating that the non-selective catalytic activity of the alumina may be severely suppressed at lower temperatures.

EXAMPLE 9

Figure 1:
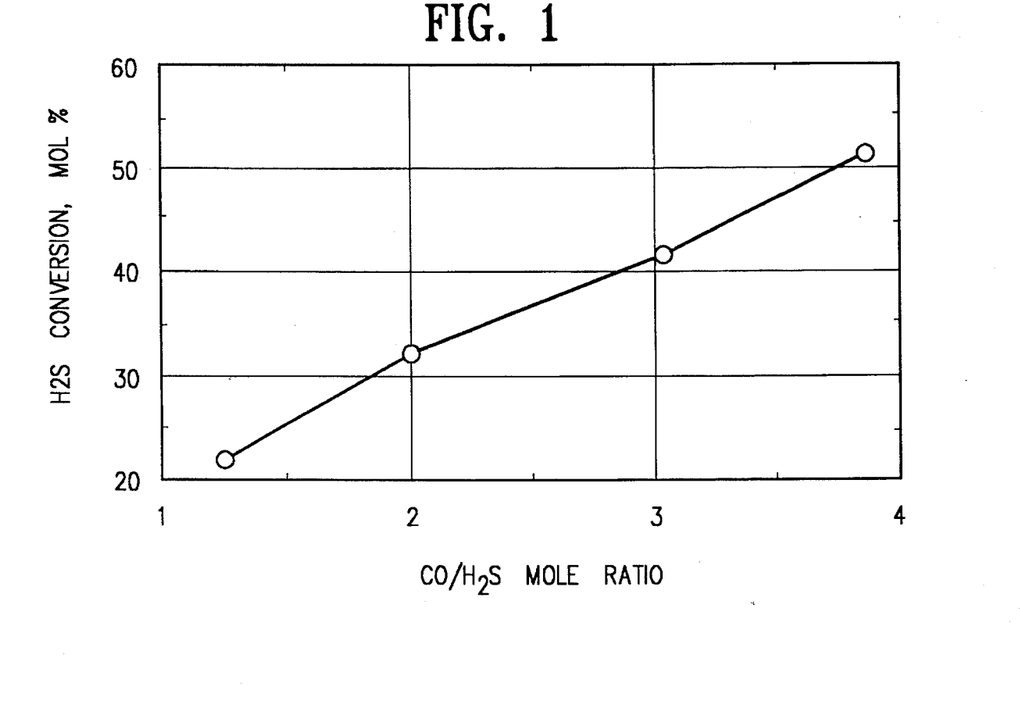
FIG. 1 is a graph showing the effect of CO/$H_2S$ mole ratio on $H_2S$ conversion.
Figure 2:
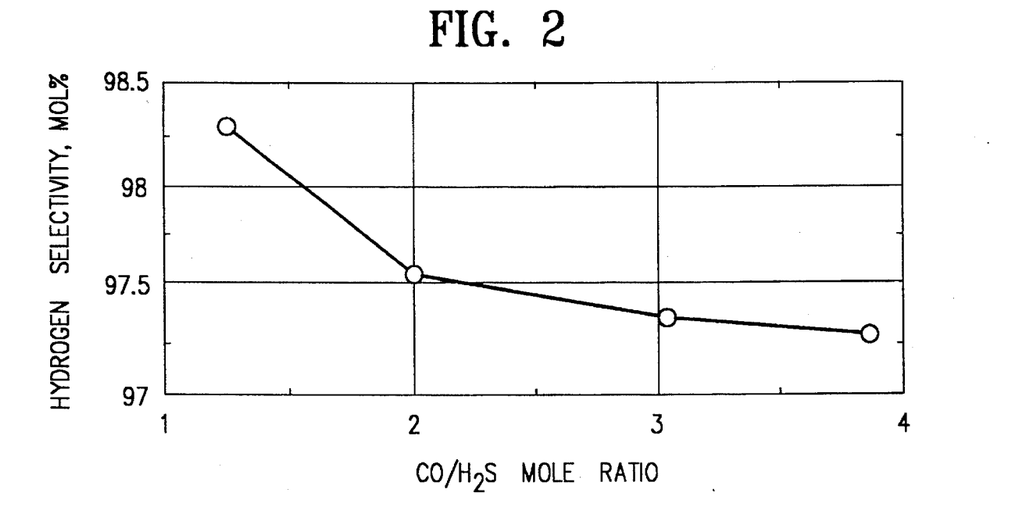
FIG. 2 is a graph showing the effect of CO/$H_2S$ mole ratio on hydrogen selectivity.

A series of experiments were conducted in which the CO to $H_2S$ ratio was varied from 1.2 to 4. Cobalt molybdate/ silica was the catalyst used and the reaction was carried out at 500° F. The apparatus and all other conditions were the same as those of Example 8. The results of these experiments are shown in FIGS. 1 and 2. FIG. 1 shows that $H_2S$ conversion increased from 22% to 51% with the increase in $CO/H_2S$ ratio. FIG. 2 shows that the hydrogen selectivity remained approximately constant over the same range of $CO/H_2S$ ratios, decreasing slightly from 98.3 to 97.4.

EXAMPLE 10

A series of fixed bed experiments, using the same apparatus as Example 8, were conducted to react COS with $SO_2$.

TABLE 2

| Catalyst Test Results at 750° F. | | | | | | |
|---|---|---|---|---|---|---|
| Catalyst | $H_2S$ Conversion | $H_2/CH_4$ Ratio | $H_2/CO_2$ Ratio | $H_2$ Selectivity | $H_2$ Yield # | Wt. % Recovery |
| $FeWO_4/SiO_2$ | 25.2 | 70 | 13.6 | 91.9 | 23.2 | 97.1 |
| $Ni_{0.5}Co_{0.5}MoO_4/SiO_2$ | 23.8 | ∞ | 28.0 | 96.6 | 23.0 | 100.0 |
| $CoMoO_4/SiO_2$ | 25.3 | 62.4 | 7.9 | 87.5 | 22.1 | 105.6 |
| Katalistiks DESOX ™ | 35.5 | 29.5 | 1.6 | 60.3 | 21.4 | 96.4 |
| $Bi_4Fe_4Mo_{12}O_{48}$ | 21.8 | ∞ | 6.7 | 87.0 | 19.0 | 98.5 |
| $NiWO_4/SiO_2$ | 19.6 | 27 | 15.4 | 90.7 | 17.8 | 95.9 |
| Alcoa S-701 | 33.8 | 2.8 | 1.6 | 50.4 | 17.1 | 92.5 |
| $FeWO_4/Al_2O_3$ | 22.4 | 2.9 | 1.5 | 49.7 | 11.1 | 93.5 |
| $LaCoO_3/SiO_2$ | 18.3 | 5.3 | 1.5 | 53.9 | 9.9 | 108.7 |
| $CoMoO_4/Al_2O_3$ | 35.9 | 1.3 | 0.8 | 24.8 | 8.9 | 91.4 |
| Ketjen KF-752 | 43.6 | 0.5 | 0.4 | 18.2 | 7.9 | 91.0 |

TABLE 3

| Catalyst Test Results at 500° F. | | | | | | |
|---|---|---|---|---|---|---|
| Catalyst | $H_2S$ Conversion | $H_2/CH_4$ Ratio | $H_2/CO_2$ Ratio | $H_2$ Selectivity | $H_2$ Yield # | Wt. % Recovery |
| $CoMoO_4/SiO_2$ | 27.5 | ∞ | 47.2 | 98.0 | 26.9 | 99.2 |
| $CoMoO_4/Al_2O_3$ | 28.0 | ∞ | 12.4 | 92.5 | 25.9 | 96.7 |
| $NiWO_4/SiO_2$ | 24.9 | ∞ | 63.3 | 98.4 | 24.5 | 92.5 |
| Ketjen KF-752 | 29.5 | 485 | 4.9 | 82.9 | 24.4 | 91.5 |
| $Ni_{0.5}Co_{0.5}MoO_4/SiO_2$ | 20.2 | ∞ | 55.7 | 98.2 | 19.8 | 97.0 |
| $FeWO_4/Al_2O_3$ | 17.4 | ∞ | 10.7 | 91.4 | 15.9 | 95.1 |
| $FeWO_4/SiO_2$ | 8.9 | ∞ | ∞ | 100 | 8.9 | 101.4 |
| $Bi_4Fe_4Mo_{12}O_{48}$ | 6.3 | ∞ | 13.6 | 93.2 | 5.9 | 98.7 |
| Alcoa S-701 | 1.1 | ∞ | 2.2 | 68.7 | 0.8 | 105.6 |

TABLE 4

| Catalyst Test Results at 250° F. | | | | | | |
|---|---|---|---|---|---|---|
| Catalyst | $H_2S$ Conversion | $H_2/CH_4$ Ratio | $H_2/CO_2$ Ratio | $H_2$ Selectivity | $H_2$ Yield # | Wt. % Recovery |
| Ketjen KF-752 | 14.4 | 6.1 | 6.1 | 75.3 | 10.8 | 98.7 |
| $NiWO_4/SiO_2$ | 10.8 | ∞ | 67 | 98.5 | 10.6 | 101.2 |
| $CoMoO_4/SiO_2$ | 7.6 | ∞ | ∞ | 100 | 7.6 | 96.4 |
| $CoMoO_4/Al_2O_3$ | 11.6 | ∞ | 1 | 50.0 | 5.8 | 92.6 |
| $FeWO_4/SiO_2$ | 0 | — | — | — | — | 102.4 |
| $FeWO_4/Al_2O_3$ | 0 | — | — | — | — | 96.6 |
| $Ni_{0.5}Co_{0.5}MoO_4/SiO_2$ | 0 | — | — | — | — | 99.1 |
| $Bi_4Fe_4Mo_{12}O_{48}$ | 0 | — | — | — | — | 94.8 |
| $Ag_2O/SiO_2$ | 0 | — | — | — | — | 97.3 |
| $AgMnO_4/SiO_2$ | 0 | — | — | — | — | 94.5 |

Nitrogen was fed to the reactor with the reactants to maintain the COS concentration below about 11.9 volume percent. The reactor feed was about 85 volume percent nitrogen. The purpose of the large $N_2$ dilution was to maintain the operation below the lower explosive limit. Typically, this reaction will be conducted outside the explosive range, e.g., either above the upper explosive limit or below the lower explosive limit. Reaction run time was approximately 1 hour and a single product gas sample was collected at the end of the run. Four commercially available catalysts were evaluated. These included 100% γ-alumina, a 50/50 mix of χ-alumina/ gibbsite, Alcoa S-201, and Alcoa S-501. The reaction was carried out at a gas hourly space velocity (GHSV) of 850 $hr^{-1}$ (based upon COS and $SO_2$ flows measured at standard temperature and pressure), 750° F., and $COS/SO_2$ ratios ranging from 0.7 to 2.0. The off gas product was mainly carbon dioxide with some small amount of carbon monoxide present. Sulfur was the sole non-gaseous product. In all cases, sulfur closure was greater than 95 wt. %. Results of these experiments are shown in Table 5.

TABLE 5

| Catalyst | $COS/SO_2$ Ratio | GHSV, $hr^{-1}$ | COS Conversion | CO Mol. % | $CO_2$ Mol. % | Recovery, wt. % |
|---|---|---|---|---|---|---|
| χ-Alumina/Gibbsite | 2.0 | 850 | 100 | 10 | 90 | 95.6 |
| χ-Alumina/Gibbsite | 0.7 | 850 | 100 | 5 | 95 | 101.0 |
| Alcoa S-201 ™ | 1.7 | 850 | 96 | 0 | 100 | 96.5 |
| Alcoa S-501 ™ | 2.0 | 850 | 67 | 6 | 94 | 88.0 |
| γ-Alumina | 2.0 | 850 | 88 | 4 | 96 | 92.9 |

EXAMPLE 11

A series of fixed bed experiments, using the same apparatus as Example 8, were conducted to combust COS in an oxygen lean environment. These experiments were conducted at temperatures ranging between 500° F. and 750° F., atmospheric pressure, a COS to air ratio of 0.42 (yielding a $COS/O_2$ ratio of 2) and a total gas residence time of either 1.5 seconds or 3.3 seconds over a variety of commercially available catalysts. These catalysts included a 50/50 mix of χ-alumina/gibbsite, 100% γ-alumina, and Vycor. Results of these experiments are shown in Table 6.

TABLE 6

| Catalyst | Temp. °F. | $COS/SO_2$ Ratio | Gas Residence Time, seconds | COS Conversion | CO Mol. % | $CO_2$ Mol. % | $SO_2$ Mol. % | Elemental Sulfur Percent | Recovery Wt. % |
|---|---|---|---|---|---|---|---|---|---|
| χ-Alumina/Gibbsite | 750 | 2.0 | 1.5 | 98 | 2 | 98 | 0 | 100 | 101.4 |
| χ-Alumina/Gibbsite | 500 | 2.0 | 3.3 | 14 | 29 | 57 | 14 | 0 | 95.3 |
| γ-Alumina | 750 | 2.0 | 1.5 | 98 | 9 | 91 | 0 | 100 | 108.4 |
| Vycor | 725 | 1.7 | 1.5 | 36 | 58 | 0 | 42 | 0 | 94.6 |

What we claim is:

1. A process for producing hydrogen from hydrogen sulfide and carbon monoxide comprising the steps of:

(a) directing a gas stream comprising hydrogen sulfide and carbon monoxide over a first catalyst at conditions effective to react the hydrogen sulfide with the carbon monoxide and to thereby produce hydrogen and carbonyl sulfide, said conditions comprising a temperature greater than about 250° F., the first catalyst being selected from the group consisting of $CoMoO_4$ on silica, $FeWO_4$ on silica, $NiWO_4$ on silica, $Ni_{0.5}Co_{0.5}MoO_4$ on silica, sulfided $CoMoO_4$ on silica, sulfided $CoMoO_4$ on alumina, sulfided $FeWO_4$ on silica, sulfided $FeWO_4$ on alumina, sulfided $NiWO_4$ on silica, sulfided $Ni_{0.5}Co_{0.5}Mo_4$ on silica, sulfided magnesium aluminate spinel further comprising cerium and vanadium and a magnesium aluminate further comprising cerium and vanadium;

(b) recovering at least a portion of the hydrogen produced in step (a) as a product;

(c) reacting at least a portion of the carbonyl sulfide produced in step (a) with oxygen under conditions effective to produce carbon dioxide and at least one of sulfur dioxide or elemental sulfur, the reaction being conducted in the absence of a second catalyst or the reaction being conducted over a second catalyst selected from the group consisting of activated alumina, gibbsite and mixtures thereof; and, optionally, (d) reacting at least a portion of any sulfur dioxide produced in step (c) over a third catalyst with at least one of hydrogen sulfide, carbonyl sulfide or oxygen to produce at least one of water, elemental sulfur, carbon dioxide, sulfur trioxide and mixtures thereof; and, optionally, (e) hydrolyzing at least a portion of any sulfur trioxide produced in step (d) with water to produce sulfuric acid.

2. The process according to claim 1 wherein sulfur dioxide is produced in step (c), and wherein step (d) comprises reacting at least a portion of the sulfur dioxide with hydrogen sulfide over the third catalyst under conditions effective to produce water vapor and elemental sulfur.

3. The process according to claim 1 wherein sulfur dioxide is produced in step (c), and wherein step (d) comprises reacting at least a portion of the sulfur dioxide with carbonyl sulfide over the third catalyst under conditions effective to produce carbon dioxide and elemental sulfur.

4. The process according to claim 1 wherein sulfur dioxide is produced in step (c), and wherein step (d) comprises reacting at least a portion of the sulfur dioxide with oxygen over the third catalyst under conditions effective to produce sulfur trioxide, and wherein at least a portion of the sulfur trioxide is hydrolyzed with water under conditions effective to produce sulfuric acid.

5. The process according to claim 1 wherein step (c) comprises reacting at least a portion of the carbonyl sulfide with oxygen over the second catalyst under conditions effective to produce carbon dioxide and elemental sulfur.

6. The process according to claim 1 wherein step (c) comprises reacting at least a portion of the carbonyl sulfide with oxygen in the absence of the second catalyst under conditions effective to produce carbon dioxide and sulfur dioxide, wherein the reaction is combustion of the carbonyl sulfide.

7. The process according to claim 1 wherein the second catalyst comprises activated alumina.

8. The process according to claim 1 comprising selecting the second catalyst from the group consisting of activated alumina, gibbsite, and mixtures thereof and reacting at least a portion of the carbonyl sulfide with less than about 1 mole of oxygen per mole of carbonyl sulfide.

9. The process according to claim 1 having conditions comprising a temperature greater than about 250° F. to react the carbonyl sulfide with oxygen in step (c).

10. The process according to claim 1 comprising reacting at least a portion of the carbonyl sulfide with at least one mole of oxygen per mole of carbonyl sulfide under carbonyl sulfide combustion conditions without the second catalyst.

11. The process according to claim 1 comprising directing at least a portion of the sulfur dioxide produced in step (c) into a Claus plant, whereby the sulfur dioxide is reacted with hydrogen sulfide.

12. The process according to claim 1 comprising selecting the third catalyst from those catalysts effective to catalyze a Claus reaction.

13. The process according to claim 1 wherein the product of step (c) comprises sulfur dioxide and wherein the sulfur dioxide produced in step (c) is reacted with calcium carbonate under conditions effective to produce calcium sulfite and then the calcium sulfite is reacted over a suitable catalyst in moist air under conditions effective to produce calcium sulfate.

14. The process according to claim 3 comprising selecting the third catalyst from the group consisting of activated alumina, gibbsite, and mixtures thereof.

15. The process according to claim 3 comprising reacting at least a portion of the sulfur dioxide and the carbonyl sulfide at a temperature of greater than about 200° C.

16. The process according to claim 4 comprising selecting the third catalyst from the group consisting of the salts of vanadium and potassium deposited on diatomaceous earth.

17. The process according to claim 4 comprising reacting the sulfur dioxide and the oxygen at a temperature of about 400° C. to about 500° C.

18. The process according to claim 4 comprising hydrolyzing at least a portion of the sulfur trioxide by adsorbing it with sulfuric acid at a temperature of about 60° C. to about 90° C. and then adding sufficient water to produce a sulfuric acid concentration of about 98 to about 99 wt. %.

19. The process according to claim 8 wherein the portion of the carbonyl sulfide is reacted with less than about 0.5 mole of oxygen per mole of carbonyl sulfide and wherein the second catalyst comprises gibbsite.

20. The process according to claim 10 wherein the portion of the carbonyl sulfide is reacted with at least 1.5 mol of oxygen per mole of carbonyl sulfide.

21. A process for producing hydrogen from hydrogen sulfide and carbon monoxide comprising the steps of:

(a) directing a first gas stream comprising hydrogen sulfide and carbon monoxide over a first catalyst at conditions effective to react the hydrogen sulfide with the carbon monoxide and to thereby produce a second gas stream, said first catalyst comprising $CoMoO_4$/silica, said second gas stream comprising hydrogen and carbonyl sulfide, said conditions comprising a temperature of about 400° F. to about 800° F. and a carbon monoxide to hydrogen sulfide mole ratio of at least about 4 to 1;

(b) separating at least a portion of the carbonyl sulfide from the second gas stream;

(c) reacting the separated carbonyl sulfide with a source of oxygen over a second catalyst, under conditions effective to produce a third gas stream comprising carbon dioxide and elemental sulfur, said second catalyst comprising at least one of the group consisting of activated alumina, gibbsite and mixtures thereof, said conditions comprising less than about 0.7 mole of oxygen per mole of carbonyl sulfide; and (d) recovering at least a portion of the hydrogen from the second gas stream.

22. A process for producing hydrogen from hydrogen sulfide and carbon monoxide comprising the steps of:

(a) directing a first gas stream comprising hydrogen sulfide and carbon monoxide over a first catalyst at conditions effective to react the hydrogen sulfide with the carbon monoxide and to thereby produce a second gas stream, said first catalyst comprising $CoMoO_4$/silica, said second gas stream comprising hydrogen and carbonyl sulfide, said conditions comprising a temperature of about 400° F. to about 800° F. and a carbon monoxide to hydrogen sulfide mole ratio of at least about 4 to 1;

(b) separating at least a portion of the carbonyl sulfide from the second gas stream;

(c) reacting the separated carbonyl sulfide with a source of oxygen over a second catalyst, under conditions effective to produce a third gas stream comprising carbon dioxide and elemental sulfur, said second catalyst comprising at least one of the group consisting of activated alumina, gibbsite and mixtures thereof, said conditions comprising a temperature of about 500° F. to about 800° F., said conditions further comprising less than about 1 mole of oxygen per mole of carbonyl sulfide; and (d) recovering at least a portion of the hydrogen from the second gas stream.

* * * * *